United States Patent [19]

Walker et al.

[11] Patent Number: 4,889,405

[45] Date of Patent: Dec. 26, 1989

[54] METHOD AND APPARATUS FOR INTERCONNECTING OPTICAL WAVE GUIDES

[75] Inventors: Robert Walker, Buff Point; Robert Fitzgerald, Bateau Bay; Hans-Dieter Bippus, Holgate, all of Australia

[73] Assignee: Krone Aktiengesellschaft, Berlin, Fed. Rep. of Germany

[21] Appl. No.: 250,903

[22] Filed: Sep. 29, 1988

[30] Foreign Application Priority Data

Sep. 30, 1987 [DE] Fed. Rep. of Germany ....... 3733469
Jan. 23, 1988 [DE] Fed. Rep. of Germany ....... 3802240

[51] Int. Cl.⁴ .............................................. G02B 6/36
[52] U.S. Cl. .................................................. 350/96.21
[58] Field of Search ................. 350/96.20, 96.21, 96.22

[56] References Cited

U.S. PATENT DOCUMENTS

| | | | |
|---|---|---|---|
| 4,506,946 | 3/1985 | Hodge ............................ | 350/96.21 |
| 4,629,284 | 12/1986 | Malavieille ..................... | 350/96.21 |
| 4,717,233 | 1/1988 | Szkaradnik ..................... | 350/96.21 |
| 4,730,892 | 3/1988 | Anderson et al. ............... | 350/96.21 |
| 4,755,018 | 7/1988 | Heng et al. ..................... | 350/96.21 |
| 4,767,180 | 8/1988 | Zajac et al. ..................... | 350/96.21 |

FOREIGN PATENT DOCUMENTS 7517996 6/1975 Fed. Rep. of Germany .
3225657 7/1984 Fed. Rep. of Germany .

Primary Examiner—William L. Sikes
Assistant Examiner—Akm E. Ullah
Attorney, Agent, or Firm—McGlew & Tuttle

[57] ABSTRACT

Optical wave guides are interconnected with the use of two interfitting shell parts which when fitted together form a continuous tubular channel for receiving the wave guides between there. For this purpose a carrier shell part is provided with a continuous longitudinal groove of a size to accommodate a cover shell part and each part has a longitudinally extending receiving channel portion of complementary form which fit together and form a continuous receiving channel for the optical wave guides which are to be interconnected. After the wave guides are placed end to end in the longitudinally extending wave guide receiving channels defined in the carrier shell, a cover shell is engaged over the carrier shell in a manner which positions it complementary optical wave guide channel with the wave guide channel defined on the carrier shell portion. Wave guide channels are advantageously made with curved up portions at respective ends of the interfitting carrier shell and cover shell. Advantageously, the cover shell has terminal rib portions which engage over weak edges of the outer surface of the wave guide carrier shell.

11 Claims, 3 Drawing Sheets

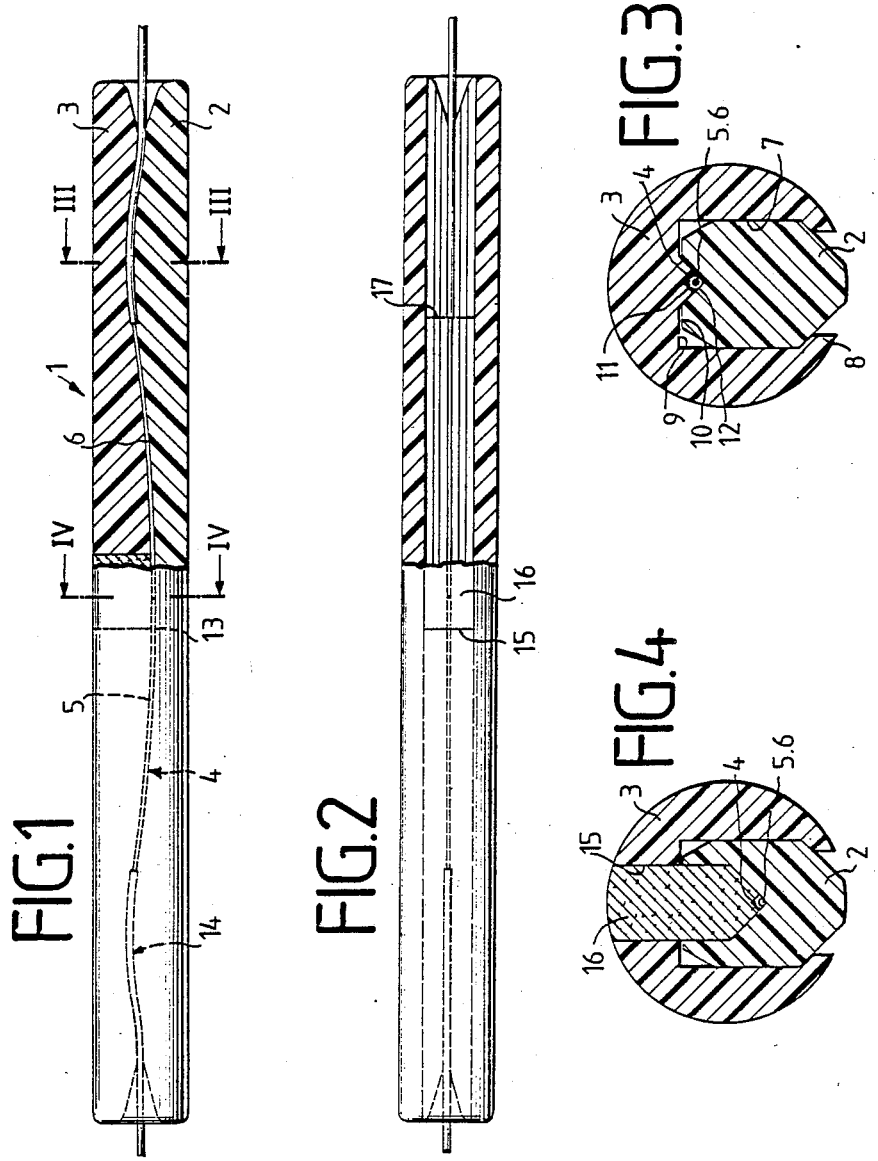

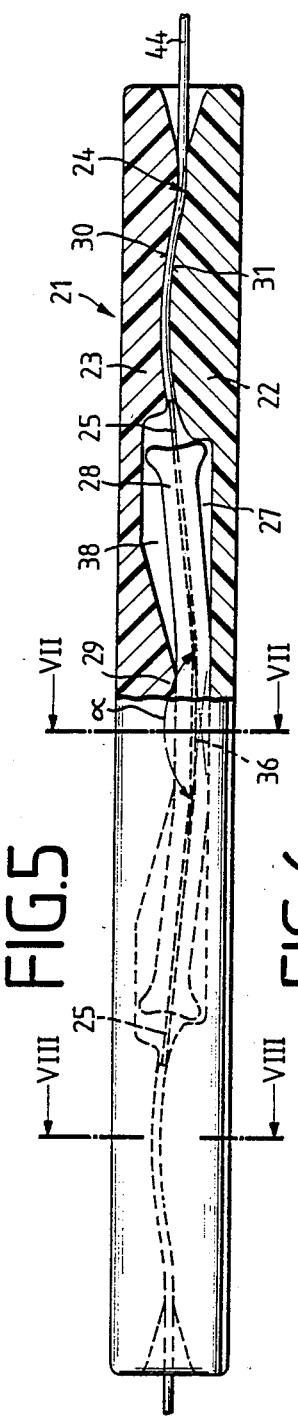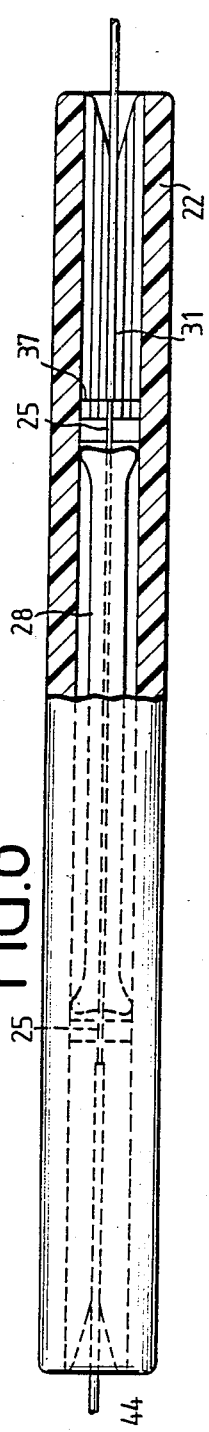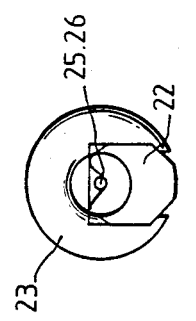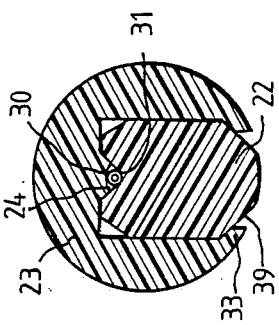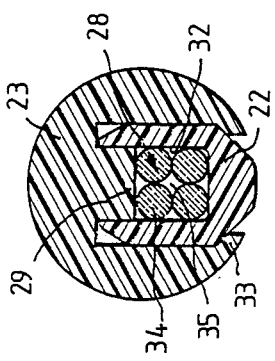
FIG.5
FIG.6
FIG.7
FIG.8
FIG.9

METHOD AND APPARATUS FOR INTERCONNECTING OPTICAL WAVE GUIDES

BACKGROUND OF THE INVENTION

1. Field of the Invention

The present invention relates to connectors and in particular to a connecting element for optical waveguides, especially glass fibers, comprising a carrier shell and a cover shell that can be joined to the carrier shell, and a guide channel for the optical waveguides.

A similar connecting element is disclosed in German utility model 7,517,996. In this element the guide channel is formed in the carrier shell. The ends of the optical waveguides to be spliced are inserted into the guide channel and glued together. Thereupon the cover shell is mounted, while the optical waveguides, which are disposed freely in the areas of their interface in the guide channel in the carrier shell, are pressed into the guide channel and are there aligned and centered, and the carrier shell and the cover shell are glued together. For additional security, either a flexible tube made of heat-shrinkage material is pulled over the joined carrier and cover shells, or a spring clip is clamped on. A disadvantage of this arrangement is that the optical waveguides can easily be damaged when they are inserted into the guide channel in the carrier shell and must be held until the connecting element is closed by means of the cover shell. Furthermore, the assembly of the connecting element for optical waveguides, which as a rule consists of three parts, namely the carrier shell, the cover shell and the flexible tube or the spring clip, is relatively cumbersome.

Furthermore, a different connecting element is known from German patent 3,225,657 and it includes a curved rod having a bore of triangular profile. The disadvantages described in connection with the aforementioned patent do not exist in this case. However, producing the triangular bore in the longitudinal direction of the curved rod is extremely difficult and expensive.

SUMMARY OF THE INVENTION

The invention provides a connecting element which is easy and inexpensive to manufacture and the assembly and insertion of the optical waveguides are simplified.

The connecting element is formed, according to the invention, of two shells that can be locked together, namely the cover shell having a continuous longitudinal groove for receiving the carrier shell and the resilient lateral ribs on the free longitudinal edges of the longitudinal groove in the cover shell for locking the lateral ribs behind the carrier shell which is pressed into the longitudinal groove. Therefore, there is provided in a technically simple manner a connecting element which, after the carrier and cover shells have been locked together, represents a single-piece connecting element corresponding to the connecting element of German patent 3,225,657. However, in a comparatively simplified form, the guide channel for the optical waveguides can be produced in the area of the pressed together internal surfaces of the carrier shell and the cover shell in the form of guide notches formed in the latter which, in contrast to the continuous triangular bore according to German patent 3,225,657, can be formed into the carrier and cover shells as longitudinally extending guide notches. Thus, the connecting element according to the present invention comprises only two interlockable parts, namely the carrier shell and the cover shell. When the optical waveguides are inserted into the guide channel of the locked connecting element, there is no risk that the optical waveguides can be damaged. In addition, the assembly of the connecting element and the splicing of the optical waveguides inside the connecting element is very simple.

A particular advantage of the inventive design of the connecting element comprising a carrier shell and a cover shell resides in the fact that the guide notches for the optical waveguides formed into the internal surfaces of the carrier shell and the cover shell may be coated with a metal, especially with chromium. Thus, the optical waveguides inserted into the guide channel in the connecting element comprising of the locked carrier and cover shells can no longer damage the plastic material of the carrier shell and the cover shell with their sharp edges.

In a particularly preferred manner, the guide channel for the optical waveguides extends straight in the longitudinal central zone of the connecting element and is curved in the two end zones. This results in a particulary favorable guiding of the optical waveguides toward the straight longitudinal central zone, where the free end faces of the optical waveguides abut against each other.

Furthermore, a connecting element is already known for the company brochure "Lightlinker, Fiber Optic Splice System", in which the guide channel is formed by a guide sleeve comprising four small glass rods of circular cross-section which are connected to each other and between them form a star-shaped guide channel for the ends of two optical waveguides which have to be introduced from both sides. In longitudinal directions, the glass rods constituting the guide channel are oriented at an obtuse angle relative to each other, while in the center of the guide channel the end faces of the optical waveguides, which have been cut off at a right angle and which have been inserted from both sides, abut against each other in a plane-parallel manner. The guide sleeve is disposed in a carrier comprising an elongated, nickel-coated copper plate with six pairs of opposed splice pieces. The two central pairs of splice pieces accommodate the guide sleeve and the pairs splice pieces, located in each case upstream and downstream of the sleeve, each accommodate a silicon rubber guide tube for the optical waveguides. The entire arrangement of carrier, guide sleeve and guide tubes is inserted, after assembly of the optical waveguides, into a metallic housing tube. Also in this case it is a drawback that the assembly of the connecting element is cumbersome. For assembly, it is necessary first to push the housing tube and one guide tube onto the end of one optical waveguide and the other guide tube onto the end of the other optical waveguide. The ends of the optical waveguides subsequently have to be inserted into the guide sleeve and there glued together. After the adhesive has dried, the two guide sleeves are pressed into the splice pieces of the carrier. Finally, the housing tube made of stainless steel is mounted over the entire arrangement. In addition to a cumbersome assembly, there is a risk that the optical waveguides could break during assembly of the connecting element.

In order to be able to provide the connecting element according to the invention with an optical waveguide sleeve as well, so as to thereby facilitate the assembly of the guide sleeve in the carrier and to avoid the risk of breaking of an optical waveguide during assembly, the invention furthermore provides that the carrier shell has a receiving groove for the optical waveguide guide sleeve in its longitudinal central zone and that the cover shell has a longitudinal rib to push the guide sleeve into the receiving groove. In this embodiment of the connecting element according to the invention, the free abutting ends of the optical waveguides are first introduced into the guide sleeve and glued together, while the sleeve is already accommodated in the receiving groove in the carrier shell. After gluing is completed, the cover shell is locked onto the carrier shell, whereupon the entire assembly operation of the connecting element is already completed. A tedious prior insertion of the ends of the optical waveguides into components of the carrier is thus no longer necessary.

Accordingly, it is an object of the invention to provide a new method of connecting optical waveguides using a tubular housing made up of at least two interfitting parts which comprises folding one part as a cover shell part having a longitudinally extending outwardly opening carrier shell receiving groove and at least one carrier shell part of a size fit into the carrier shell part groove and including forming each part with complementary, alignable and interengageable optical waveguide channels, and further positioning the light wave guides to be connected in an end to end relationship in the carrier shell part light wave guide channel, and engaging the cover shell part into the groove of the carrier shell part so as to enclose the light wave guide between the complementary light wave guide channel and advantageously, enclosing the light wave guide in a guide sleeve before it is positioned in the carrier shell light wave guide channel.

Further object of the invention is to provide a connecting element for interconnecting optical wave lengths guide which comprises a carrier shell having a groove extending from its interior outwardly to its surface and having an optical waveguide carrier shell receiving channel to find along its length on its interior on the groove and a cover shell engageable in the groove which has an optical wave guide cover shell receiving channel defined along its length which complements the carrier shell optical wave guide receiving channel.

A further object of the invention is to provide a connecting element for interconnecting optical waveguides which is simple in design, rugged in construction and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

BRIEF DESCRIPTION OF THE DRAWINGS

In the drawings:

FIG. 1 is a side view, shown partially in section, of a connecting element constructed in accordance with the invention;

FIG. 2 is a plan view, shown partially in section, of a connecting element according to FIG.1, FIG. 3 is a cross-section taken along the line III—III in FIG. 1, FIG. 4 is a cross-section taken along the line IV—IV in FIG. 1, FIG. 5 is a side view, shown partially in section, of the connecting element of another embodiment of the invention;

FIG. 6 is a plan view, shown partially in section of a connecting element according to FIG. 5, FIG. 7 is a cross-section taken along the line VII—VII in FIG. 5, FIG. 8 is a cross-section taken along the line VIII—VIII in FIG. 5, FIG. 9 is a front view of the connecting element of FIG. 5 and, FIG. 10 is a side elevational view of a mounting rail for the connecting element of the embodiment of FIG. 5.

GENERAL DESCRIPTION OF THE PREFERRED EMBODIMENTS

Figure 10:
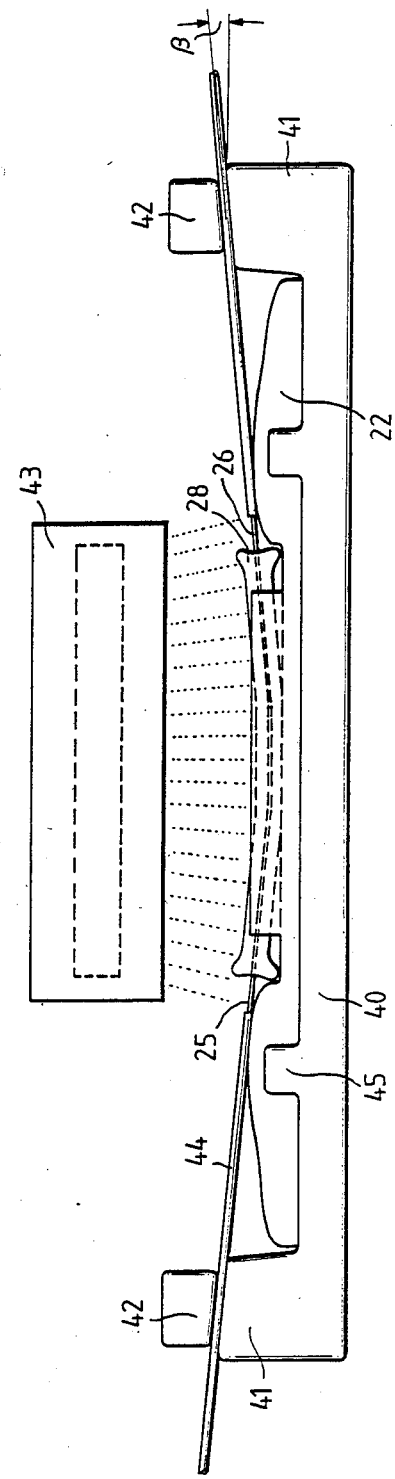

Referring to the drawings in particular the invention therein comprises a method of connecting optical waveguides 5 and 6 which are arranged in end to end relationship by carrier shell 2 which has a receiving notch or optical wave guide channel 12 defined in a top surface thereof. The cover shell part 3 has a continuous longitudinal receiving groove 7 into which the carrier shell is insertable towards the position its guide notch 12 in alignment with a complementary guide notch 11 which together define a channel for the passage of the optical wave guides 5 and 6.

The connecting element 1 for optical waveguides 5 and 6, especially a glass fibre element, comprises a carrier shell 2 and a cover shell 3 that can be joined to the carrier shell, and which together from a guide channel 4 for the optical waveguides 5 and 6. The carrier shell 2 and the cover shell 3 are made of plastic. In order to join the carrier shell 2 and the cover shell 3, the cover shell 3 has a continuous longitudinal groove 7 of a construction for receiving the carrier shell 2, as is shown in particular in FIG. 3. The outer side walls of the carrier shell 2, which has a substantially rectangular crosssection, are disposed flat against the inner side walls of the longitudinal groove 7 in the cover shell 3. Furthermore, resilient lateral ribs 8 are formed on the free longitudinal edges of the longitudinal groove 7 in the cover shell 3, which serve for locking behind the carrier shell 2 which is pressed into the longitudinal groove 7, for which purpose the side edges of the carrier shell are chamfered. The guide channel 4 for the optical waveguides 5 and 6 is formed in the zone of the pressed together internal surfaces 9 and 10 of the cover shell 3 and the carrier shell 2 and is constituted by the guide notches 11 and 12 which are triangular in cross-section.

The guide channel 4 constituted by the guide notches 11 and 12 for the optical waveguides 5 and opposed 6 extends substantially straight or axially in the longitudinal central zone 13 of the connecting element 1 and extends under a radius of curvature 14 toward the two end zones of the connecting element 1, so that the guide channel 4 as a whole is curved in the end zones of the connecting element 1, as is shown in particular in FIG. 1.

Since the carrier shell 2 and the cover shell 3 are made of plastic, there is a risk that the optical waveguides 5, 6 which are inserted into the guide channel 4 when the carrier shell 2 and the cover shell 3 are locked together, could damage the plastic material of the carrier and cover shells 2 and 3 with their sharp edges. In order to prevent this, the guide notches 11 and 12 forming the guide channel 4 in the carrier shell 2 and the cover shell 3 are provided with a metal coating, especially a chromium coating, whose hardness is greater than the hardness of the material of the optical waveguides 5 and 6.

A sealing aperture 15 emerges in the straight longitudinal central zone 13 of the guide notch 11 of the guide channel 4, which aperture can be sealed by means of a sealing plug 16, as is shown in FIG.4.

After the manufacture from plastic of carrier shell 2 and cover shell 3 in the first embodiment of the connecting element 1 as described above and illustrated in FIGS. 1 to 4, the respective guide notches 11 and 12 are provided with chromium coatings.

The thus formed cover shell 3 is then locked onto the complementary shaped carrier shell 2, with the resilient lateral ribs 8 locking behind the chamfered edges of the carrier shell 2, as illustrated in FIG. 3.

As a result of the engagement of the internal surfaces 9 and 10 of the carrier shell 2 and the cover shell 3, the guide channel 4 for the optical waveguides 5 and 6 is formed between the guide notches 11 and 12. These optical waveguides 5 and 6 are then inserted from both sides into the connecting element and abut against each other with their flat end faces in the straight longitudinal central zone 13. Thereupon a suitable adhesive is introduced through the sealing aperture 15, which firmly connects the abutting ends of the optical waveguides 5 and 6 to each other. Finally, the plug 16 for sealing the sealing aperture 15 is inserted and glued in position.

As is also shown in FIG. 2, the guide notches 11 and 12 have a larger cross-section from the free end faces of the connecting element 1 up to about the line 17, so that up to this point the optical waveguides 5 and 6 may be provided with insulation. Only in the zone between the two lines 17, i.e. in a partial zone of the curved guide channel 4 and in the straight longitudinal central zone 13 of the guide channel 4 the optical waveguides 5 and 6 need to be insulated beforehand.

In the second embodiment shown in FIGS. 5 to 10, the connecting element 21 for optical waveguides, especially glass fibers, comprises a carrier shell 22 and a cover shell 23, which between them form a guide channel 24 for the optical waveguides 25 and 26. In the longitudinal central zone the carrier shell 22 has a receiving groove 27 for an optical waveguide guide sleeve 28, which may be formed as in U.S. Pat. No. 4,506,946 (cf. also the company brochure "Lightlinker, Fiber Optic Splice System"). In the region of the receiving groove 27, the cover shell 23 has a longitudinal rib 29 maintaining the guide sleeve 28 in the receiving groove 27. The carrier shell 22 and the cover shell 23 have opposed guide notches 30 and 31 for the optical waveguides 25 and 26 upstream and down stream of the receiving groove 27 and the longitudinal rib 29, respectively. The cover shell 23 has a circular cross-section and furthermore has a continuous longitudinal groove 32 for accommodating the carrier shell 22, with resilient lateral ribs 33 being provided on the longitudinal edges of the longitudinal groove 32 which lock behind the carrier shell 22 after the cover shell 23 has been pressed on.

The guide sleeve 28 comprises four parallel small glass rods 34 which are firmly interconnected and which between them form a star-shaped guide channel 35 into which the ends of the glass fibers 25, 26 are inserted. The small glass rods 34 are oriented relative to each other at an obtuse angle $\bar{a}$ and form the guide channel 35 which accordingly extends under an obtuse angle $\bar{a}$, the guide channel having a straight section in its longitudinal central zone 36, in which section the end faces of the glass fibers 25, and 26, which are cut off at a right angle to the longitudinal axis of the glass fibers 25, 26, abut in a parallel plane. The carrier and cover shells 22, and 23 which accommodate the guide sleeve 28 comprising the small glass rods 34 are made of plastic.

As is shown in particular in FIG. 5, the guide notches 30, 31 arranged upstream and downstream of the receiving groove 27 and the longitudinal rib 29 are curved in the longitudinal direction of the connecting element 21, the curvature being selected such that the optical waveguides 25 and 26 emerging from the guide channel 35 of the guide sleeve 28 are guided safeguarded against breaking under a large radius of curvature and can then verge centrally from the connecting element 21.

The optical waveguides 25 and 26 are provided with an insulating jacket 44 which is supported in the curved guide notches 30 and 31. In the zone of the guide channel 35 of the of the guide sleeve 28, the jacket 44 is removed, starting from the area 37 in the longitudinal central zone 36 of the connecting element 21.

FIG. 5 shows that the longitudinal rib 29 in the cover shell 23 extends only over the longitudinal central zone of the guide sleeve 28, whereas the cover shell 23 has receiving openings or cavities 38 for the end zones of the guide sleeve 28 which extend at both ends of the longitudinal rib 29. FIG. 6 shows in plan view the design of the guide notch 31 in the carrier shell 22, the guide notch 31 being V-shaped. FIG. 7 shows how the guide sleeve 28 is held in the receiving groove 32 of the carrier shell 22 by means of the longitudinal rib 29 of the cover shell 23 and how the carrier shell 22 is locked in the cover shell 23 by means of the resilient lateral ribs 33, which look behind the chamfered portions 39 of the carrier shell 22. FIG. 8 shows the solid, substantially rectangular cross-section of the carrier shell 22 in the region of the curved guide notches 30, 31.

FIG. 10 shows a mounting rail 40 in which the carrier shell 22 is accommodated between guide walls 41 at the ends and lateral splice pieces 45. The guide sleeve 28 is already disposed in the carrier shell 22. The upper sides of guide walls 41 are chamfered at an angle $\beta$ of 5° and provided with retaining fingers 42. Between the upper sides of the guide walls 41 and the retaining fingers 42, the optical waveguides 25, 26 are introduced at an angle $\beta$ of 5° into the guide sleeve 28 and are there glued together by means of an adhesive which hardens under the UV light of a lamp 43, with the end faces of the optical waveguides being plane-parallel to each other. After hardening, the carrier shell 22 is removed from the mounting rail 40. The optical waveguides 25 and 26 are inserted into the curved guide notches of the carrier shell 22. Then the cover shell 23 is snapped on, whereupon the assembly of the connecting element 21 is complete.

While specific embodiments of the invention have been shown and described in detail to illustrate the application of the principles of the invention, it will be understood that the invention may be embodied otherwise without departing from such principles.

What is claimed is:

1. A connecting element for beam wave guides, comprising;

a carrier shell having a guide notch extending longitudinally a cover shell having a continuous longitudinal groove of generally rectangular cross-section for receipt of the carrier shell, of generally rectangular cross-section, said cover shell having lateral resilient rib portions which may be expanded for positioning said carrier shell in said cover shell longitudinal groove and said rib portions acting to lock said carrier shell in said longitudinal groove, said cover shell having guide notches formed in the longitudinal groove, said cover shell having a guide notch cooperating with said carrier shell guide notch to form a guide groove, said guide groove being continuous and having a subtantially constant cross section over the length of said cover shell and said carrier shell, said guide groove cooperating with said carrier shell and said cover shell to define a first end section, a longitudinal middle section and a second end section, said longitudinal middle section being positioned between said first and second end sections, said guide groove being curved in said first and section, said guide groove being straight in said longitudinal middle section and said guide groove being curved in said second end section.

2. A connecting element according to claim 1, wherein; each of said guide notches for said optical wave guides is coated with a metal, especially chromium.

3. A connecting element according to claim 1, including a sealing aperture defined in at least one of said carrier shell and said cover shell which extends into the longitudinal middle section of said element and including a plug covering the aperture.

4. A connecting element according to claim 1, wherein said carrier shell has a receiving groove situated in the center thereof; an optical wave guide sleeve being positioned in said receiving groove, said cover shell having a longitudinal rib said wave guide sleeve covering said wave guides and being anchored against said rib to form said guide groove in said longitudinal middle section.

5. A connecting element according to claim 5, including a mounting rail for accommodating said carrier shell, said mounting rail having two guide walls between which said carrier shell is positioned, a guide sleeve into which each end of said waveguide fibers are positioned, said mounting rail having guide walls at each end inclined upwardly in an assembly angle $\beta$, and being provided with retaining fingers for glass fibers.

6. A connection element according to claim 1, wherein said carrier shell includes a channel in said longitudinal middle section cooperating with said guide channel to form a receiving groove, said wave guides being positionable in a guide sleeve within said receiving groove, said wave guides extending from said guide sleeve into said guide grooves in said first and second end portions.

7. A connection element for beam wave guides comprising: a cover shell forming a continuous longitudinal groove with resilient lateral ribs adjacent an opening of the groove, the groove having a base with a cover shell notch formed extending along a first end portion of the cover shell and extending along a second end portion of the cover shell, an intermediate middle section of the cover shell being defined between said first and second end of the cover shell; a carrier shell having a carrier shell notch, said carrier shell being positionable in said groove between said lateral ribs, said lateral ribs retaining said carrier shell within said groove, said carrier shell notch cooperating with said cover shell notch to form a guide groove having a substantially constant cross-sectional area, said guide groove having curved portions in said first end portion and said second end portion, said guide groove being straight in said longitudinal middle section.

8. A connection element according to claim 7, wherein said carrier shell notch and said cover shell notch extend the entire length of said carrier shell and said cover shell.

9. A method of connecting optical wave guides using a tubular housing made of at least two interfitting parts, comprising forming one part as a cover shell part having a longitudinally extending outwardly opening carrier shell receiving groove and forming at least one carrier shell part of a size to fit into the carrier shell receiving groove of said cover shell part, and forming each of said carrier shell part and said cover shell part with complementary alignable and interengaging longitudinally extending notches cooperating to form a light wave guide channel, the guide channel having curved end sections and a straight longitudinal middle section, said cover shell having springable lateral ribs; positioning the light wave guides to be connected in end to end relationship in the light wave guide channel of said carrier shell part and engaging the carrier shell part into the carrier shell receiving groove of the cover shell part by spreading the springable lateral ribs and engaging the lateral ribs about the carrier shell so as to enclose the light wave guides between the complementary wave guide channels.

10. A method according to claim 7, including using a mounting rail having spaced apart upwardly extending splice pieces, and said carrier shell is insertable over said mounting rail and has openings which engage over the splice pieces to center said carrier shell part and wherein the complementary wave guide channels includes recess portion accommodating a wave guide sleeve and wherein the wave guide sleeve containing a respective end of the wave guides to be joined together is positioned between the recess of said carrier shell.

11. A method according to claim 10, wherein said waveguides are glass fibers which are inserted in said guide sleeve and wherein said mounting rail includes retaining fingers for holding said glass fibers and including having means associated with the mounting rail for heating the wave guide sleeve with the glass fibers.

* * * * *